(12) United States Patent
Abe et al.

(10) Patent No.: US 11,739,788 B2
(45) Date of Patent: Aug. 29, 2023

(54) CRANKSHAFT AND METHOD OF MANUFACTURING THE SAME

(71) Applicant: NIPPON STEEL CORPORATION, Tokyo (JP)

(72) Inventors: Tatsuhiko Abe, Tokyo (JP); Manabu Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 409 days.

(21) Appl. No.: 17/268,807

(22) PCT Filed: Aug. 22, 2019

(86) PCT No.: PCT/JP2019/032880
§ 371 (c)(1),
(2) Date: Feb. 16, 2021

(87) PCT Pub. No.: WO2020/045239
PCT Pub. Date: Mar. 5, 2020

(65) Prior Publication Data
US 2021/0172470 A1   Jun. 10, 2021

(30) Foreign Application Priority Data
Aug. 31, 2018 (JP) ................. 2018-162814

(51) Int. Cl.
*F16C 3/08* (2006.01)
*B24B 5/42* (2006.01)
*B24B 21/02* (2006.01)

(52) U.S. Cl.
CPC .................. *F16C 3/08* (2013.01); *B24B 5/42* (2013.01); *B24B 21/02* (2013.01)

(58) Field of Classification Search
CPC .............. F16C 3/08; B24B 5/42; B24B 21/02
See application file for complete search history.

(56) References Cited

U.S. PATENT DOCUMENTS

| | | | |
|---|---|---|---|
| 5,913,716 A | 6/1999 | Mucci et al. | |
| 2004/0166776 A1 | 8/2004 | Kondo et al. | |
| 2010/0101085 A1 | 4/2010 | Miura | |
| 2016/0273576 A1* | 9/2016 | Schreiber | B23H 9/008 |

FOREIGN PATENT DOCUMENTS

| | | | |
|---|---|---|---|
| JP | 08510693 A | 11/1996 | |
| JP | 2004276121 A | 10/2004 | |
| JP | 4352261 B2 | 10/2009 | |
| JP | 55003417 A | 5/2014 | |
| JP | 2017218951 A | 12/2017 | |
| WO | 2009004738 A1 | 1/2009 | |
| WO | 2016072305 A1 | 5/2016 | |

* cited by examiner

*Primary Examiner* — David P Bryant
*Assistant Examiner* — Christine Bersabal
(74) *Attorney, Agent, or Firm* — Greer Burns & Crain Ltd.

(57) ABSTRACT

A crankshaft with improved seizure resistance is provided. A crankshaft includes a journal and a pin, each of the journal and pin having such a surface geometry that the arithmetical mean height of the primary profile, Pa, is 0.090 μm or smaller and the reduced peak height Rpk is 0.070 μm or smaller. As used herein, arithmetical mean height of a primary profile Pa is defined in JIS B 0601 (2001), and reduced peak height Rpk is defined in JIS B 0671 (2002).

2 Claims, 6 Drawing Sheets

CRANKSHAFT AND METHOD OF MANUFACTURING THE SAME

This is a National Phase Application filed under 35 U.S.C. § 371, of International Application No. PCT/JP2019/032880, filed Aug. 22, 2019, the contents of which are incorporated by reference.

TECHNICAL FIELD

The present invention relates to a crankshaft and a method of manufacturing such a crankshaft.

BACKGROUND ART

Crankshafts are required to have fatigue strength, wear resistance and, in addition, seizure resistance.

Proposals have been made to improve seizure resistance by controlling the surface geometry of a sliding part. For example, JP 2017-218951 A describes a crankshaft for a freezer compressor having a surface roughness Ra of 0.05 μm or lower. WO 2016/072305 describes a rotating slide bearing composed of a bearing and a shaft, the shaft having a surface roughness Ra of 0.10 μm or lower.

Japanese Patent No. 5503417 describes a case hardening steel part having a surface roughness Ra of 0.16 μm or lower to improve sliding properties. Japanese Patent No. 4352261 describes a gear with a surface roughness as measured along the direction of load movement of 0.2 μm≤Rpk+0.5 Rk≤0.8 μm to improve pitting resistance.

JP 2004-276121 describes a method of roller burnishing that involves preparing a workpiece having a surface to be treated with an arc-shaped cross section and pressing burnishing rollers against the workpiece for finishing, where the workpiece surface to be treated is lapped so as to be recessed at its center and, thereafter, the protrusions at both ends are burnished by the burnishing rollers.

DISCLOSURE OF THE INVENTION

In recent years, there has been a growing trend to use lubricants with lower and lower viscosities and crankshaft sliding parts with thinner and thinner shafts in order to improve fuel efficiency, and crankshafts are required to have even better seizure resistance.

An object of the present invention is to provide a crankshaft with improved seizure resistance and a method of manufacturing such a crankshaft.

A crankshaft according to an embodiment of the present invention includes a journal and a pin, each of the journal and pin having such a surface geometry that an arithmetical mean height of a primary profile, Pa, is 0.090 μm or smaller and a reduced peak height Rpk is 0.070 μm or smaller.

A method of manufacturing a crankshaft according to an embodiment of the present invention is a method of manufacturing such a crankshaft as described above, including: a grinding step in which the journal and the pin are ground; a rough lapping step in which the journal and pin that have been ground are lapped using a film coated with alumina abrasive grains; and a finish lapping step in which the journal and pin that have been roughly lapped are lapped using a film coated with diamond abrasive grains.

The present invention provides a crankshaft with improved seizure resistance.

EMBODIMENTS FOR CARRYING OUT THE INVENTION

JP 2017-218951 A, WO 2016/072305 and Japanese Patent No. 5503417, discussed above, specify surface geometries using the arithmetical mean height of a roughness profile, Ra (hereinafter referred to as "average roughness Ra"). However, specifying a geometry using average roughness Ra has the following problems.

The surface geometry of an industrial product, such as a crankshaft, includes not only short-period components (i.e., roughness), but also non-negligible levels of long-period components (i.e., undulations) caused by, for example, vibrations of the grinding machine. The average roughness Ra is based on a roughness profile obtained after removal of undulating components through a high-pass filter, and thus it cannot be said, without reserve, that the value exactly reflects the actual surface geometry. Further, the value of the average roughness Ra significantly varies depending on the cut-off value λc of the high-pass filter used to obtain the roughness profile.

Actually, even for about the same level of average roughness Ra, seizure resistance significantly varies depending on the magnitude of undulations. Thus, an evaluation parameter using a primary profile as the assessed profile would be a more suitable indication used to control seizure resistance.

Further, even for about the same level of average roughness Ra, seizure resistance varies depending on the geometries of protrusions and valleys. Specifically, even for about the same level of average roughness Ra, larger heights of protrusions lead to increased frequency of contact with the other part, decreasing seizure resistance.

The present inventors fabricated test shafts with various surface geometries and evaluated their seizure resistance to investigate the relationship between surface geometry and seizure resistance, and found out that seizure resistance can be significantly improved over conventional shafts if the arithmetical mean height of a primary profile, Pa, is 0.090 μm or smaller and the reduced peak height Rpk is 0.070 μm or smaller.

The present invention was made based on the above-described findings. An embodiment of the present invention will now be described in detail with reference to the drawings. The same or corresponding portions in the drawings are labeled with the same reference characters, and their description will not be repeated. The size ratios between the components shown in the drawings do not necessarily indicate the actual size ratios.

[Crankshaft]

Figures 1, 2:
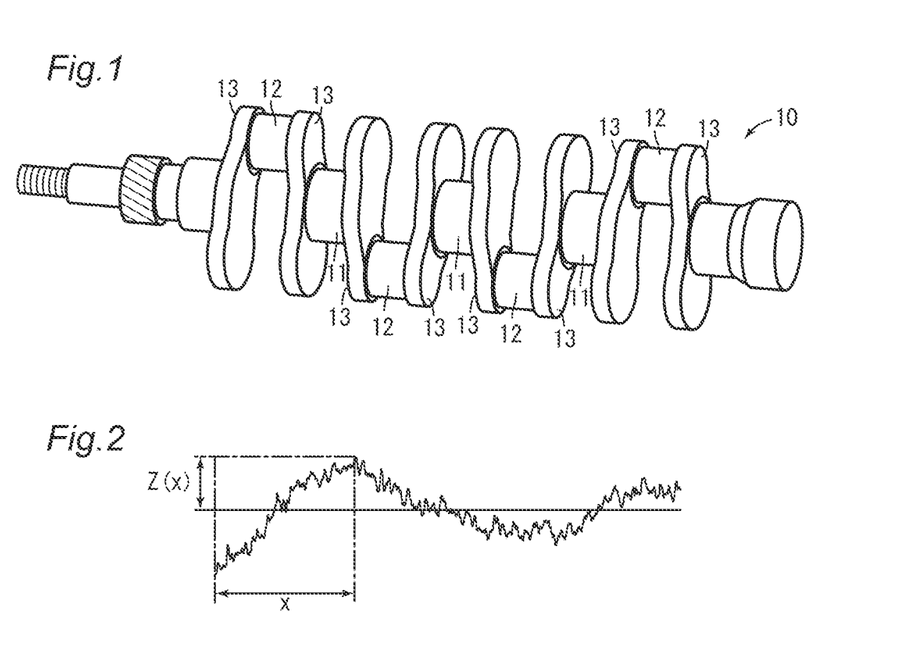
FIG. 1 is a schematic view of a crankshaft according to an embodiment of the present invention.
FIG. 2 is an exemplary primary profile.

FIG. 1 is a schematic view of a crankshaft 10 according to an embodiment of the present invention. The crankshaft 10 includes journals 11, pins 12, and arms 13.

The crankshaft 10 may be made from a steel material for mechanical structures, for example. Although not limiting, the crankshaft 10 may be made from a carbon steel material for mechanical structures in accordance with JIS G 4051: 2009; a steel material for mechanical structures in accordance with JIS G 4052:2008 which provides sufficient hardenability (H steel); or an alloyed steel material for mechanical structures in accordance with JIS G 4053:2008, for example. Among them, S45C and S50C in accordance with JIS G 4051:2009 and SMn438 in accordance with JIS G 4053:2008 are suitable, and such steel materials to which S has been added to improve machinability are particularly suitable.

The crankshaft 10 may have a chemical composition, including, for example, in mass %: 0.30 to 0.60% C; 0.01 to 2.0% Si; 0.1 to 2.0% Mn; 0.01 to 0.50% Cr; 0.001 to 0.06% Al; 0.001 to 0.02% N; up to 0.03% P; and up to 0.20% S. The chemical composition of the crankshaft 10 may include other elements (for example, V and/or Nb).

The journals 11 are concentric with the central axis of the crankshaft 10 and are connected to cylinder blocks (not shown). The pins 12 are displaced in position from the central axis of the crankshaft 10, and connected to connecting rods (not shown). The arms 13 connect the journals 11 with the pins 12.

Each of the journals 11 and pins 12 has such a surface geometry that the arithmetical mean height of the primary profile, Pa, is 0.090 μm or smaller and the reduced peak height Rpk is 0.070 μm or smaller. As used herein, arithmetical mean height of a primary profile Pa is defined in JIS B 0601 (2001), and reduced peak height Rpk is defined in JIS B 0671 (2002).

Figure 3:
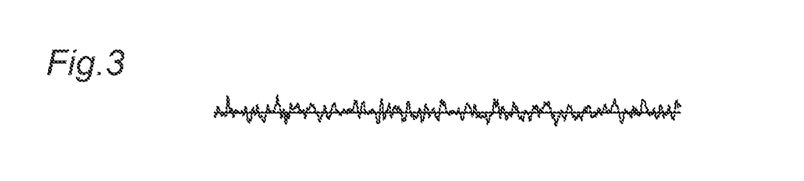
FIG. 3 is an exemplary roughness profile.
Figure 4:
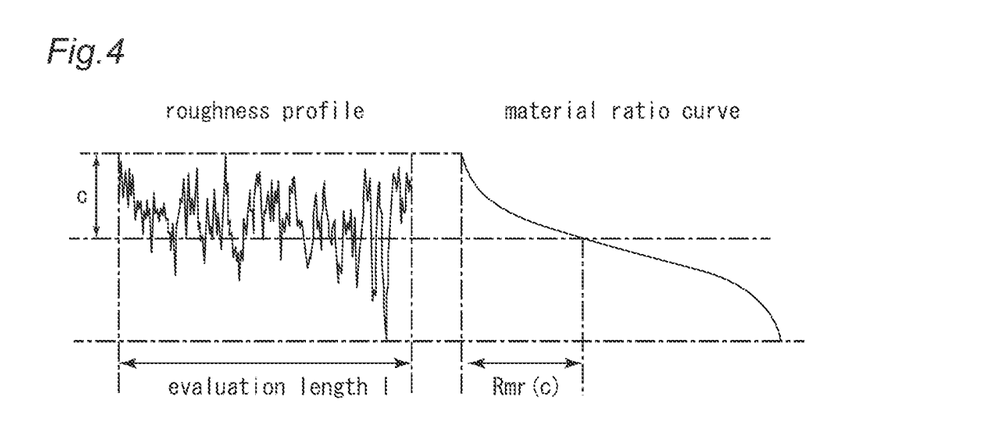
FIG. 4 shows the relationship between a roughness profile and a material ratio curve.
Figure 5:
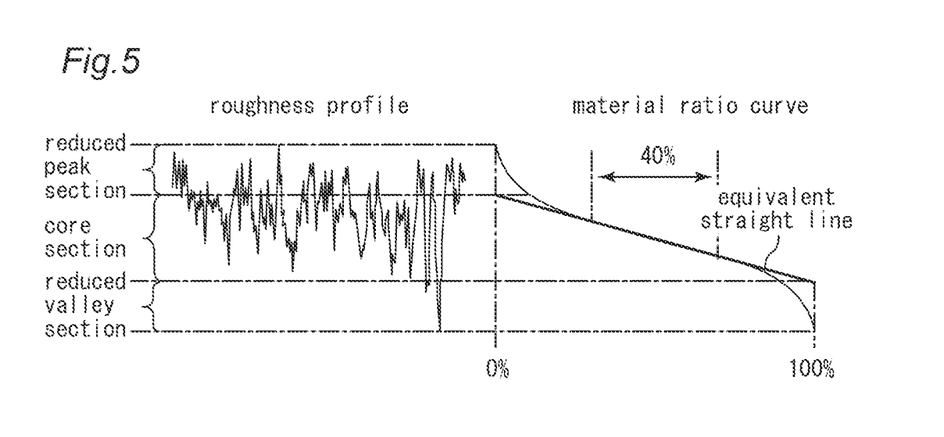
FIG. 5 illustrates reduced peaks.

FIGS. 2 and 3 show an exemplary primary profile and an exemplary roughness profile, respectively. FIG. 4 shows the relationship between a roughness profile and a material ratio curve, and FIG. 5 illustrates reduced peaks. A method of measuring the arithmetical mean height of a primary profile Pa and a reduced peak height Rpk will be described with reference to these graphs.

Test specimens are taken from the crankshaft 10 at locations for measurement (i.e., on the journals 11 and pins 12), and a contact-type roughness tester is used to obtain a measured primary profile. The contact roughness tester is to have a stylus with a tip radius of 2 μm and a cone with a taper angle of 60°. The scan rate is to be 0.5 mm/s or lower, and the length for measurement is to be 5 mm or larger.

A low-pass filter with a cut-off value λs is applied to the measured primary profile to obtain a primary profile (see FIG. 2). Using the primary profile as the assessed profile, the average of the absolute values of Z(x) in the evaluation length l is calculated, which is treated as the arithmetical mean height of the primary profile Pa. Here, Z(x) is the vertical coordinate at a location X; the cut-off value λs is 2.5 μm, and the evaluation length is 5 mm.

A high-pass filter with a cut-off value λc is applied to the primary profile to obtain a roughness profile (see FIG. 3). The cut-off value λc used to obtain the roughness profile is 0.25 mm.

A material ratio curve is calculated from the roughness profile. A material ratio curve is a curve representing the material ratio Rmr of a roughness profile as a function of the cut level c (see FIG. 4). The evaluation length l used to calculate the material ratio curve is 5 mm.

The average height of the reduced peaks above the core section will be referred to as reduced peak height Rpk (see FIG. 5).

If the arithmetical mean height of the primary profile Pa is 0.090 μm or smaller and the reduced peak height Rpk is 0.070 μm or smaller, this will significantly improve seizure resistance over conventional shafts. The arithmetical mean height of the primary profile Pa is preferably 0.080 μm or smaller. The reduced peak height Rpk is preferably 0.060 μm or smaller.

[Method of Manufacturing Crankshaft]

An exemplary method of manufacturing the crankshaft 10 will now be described. The method described below is merely an example and is not intended to limit the method of manufacturing the crankshaft 10.

Figure 6:
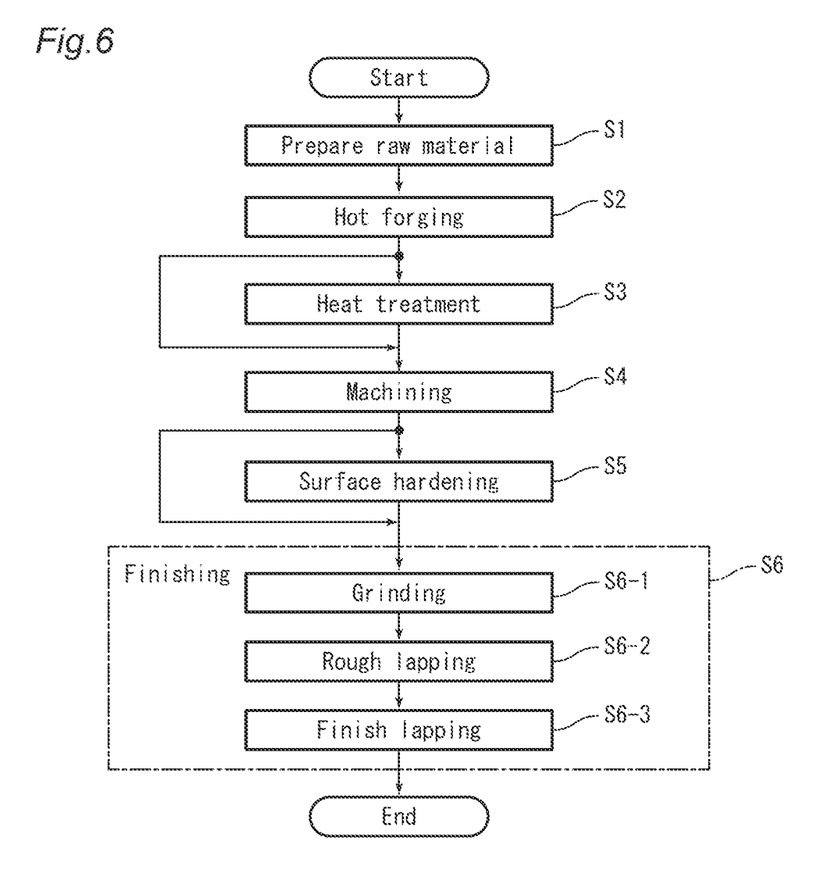
FIG. 6 is a flow chart illustrating an exemplary method of manufacturing the crankshaft of FIG. 1.

FIG. 6 is a flow chart showing an exemplary method of manufacturing the crankshaft 10. The method includes: the step of preparing raw material (step S1); a hot-forging step (step S2); a heat treatment step (step S3); a machining step (step S4); a surface-hardening step (step S5); and a finishing step (step S6). These steps will be described in detail below.

Raw material for the crankshaft 10 is prepared (step S1). Although not limiting, the raw material for the crankshaft 10 may have a chemical composition including, for example, in mass %: 0.30 to 0.60% C; 0.01 to 2.0% Si; 0.1 to 2.0% Mn; 0.01 to 0.50% Cr; 0.001 to 0.06% Al; 0.001 to 0.02% N; up to 0.3% P; and up to 0.20% S. The raw material for the crankshaft 10 may be material containing other elements (e.g., V and/or Nb).

The raw material may be a steel bar, for example. The raw material may be produced by, for example, subjecting steel melt having the above-specified chemical composition to continuous casting or blooming.

The raw material is hot forged to produce a roughly shaped product for the crankshaft (step S2). The hot forging may be divided into the substeps of rough forging and finish forging.

The roughly shaped product for the crankshaft produced by the hot forging is subjected to a heat treatment, such as normalizing, as necessary (step S3). The heat treatment step (step S3) is optional, and may be omitted depending on the property required of the crankshaft, for example.

The roughly shaped product for the crankshaft is machined (step S4). The machining includes cutting, grinding and/or drilling. This step results in an intermediate product that has a shape close to that of the final product.

The intermediate product for the crankshaft that has been machined is subjected to surface hardening as necessary (step S5). The surface hardening may be, for example, fillet rolling, induction hardening and/or soft nitriding. The surface hardening step (step S5) is optional and may be omitted depending on the property required of the crankshaft, for example.

The surface hardening may be performed on the entire intermediate product for the crankshaft, or may only be performed on the slidable portions, i.e., journals and pins.

If the surface hardening step (step S5) is performed, the microstructure in the surface region should be made uniform; otherwise, in the finishing step discussed later (step S6), removing undulations on the surface would be difficult. Conceivable methods for making the microstructure in the surface region uniform include, for example for induction hardening, raising the temperature to or above the $Ac_3$ point to completely transform the microstructure in the surface region to austenite before quenching.

The intermediate product for the crankshaft is subjected to the finishing (step S6). The finishing step (step S6) includes the substeps of grinding (step S6-1), rough lapping (step S6-2) and finish lapping (step S6-3).

First, the journals 11 and pins 12 are ground (step S6-1). To reduce the average height Pa of the primary profile, both the roughness and undulations must be reduced. The roughness depends on the size of the abrasive grains used for grinding. Accordingly, the finer the abrasive grains used for grinding, the better.

The journals 11 and pins 12 have undulations with periods of several hundreds of micrometers to several millimeters caused by the forwarding and/or vibration of the tool during the machining (step S4). Even if the roughness has been sufficiently reduced (i.e., the arithmetical mean height of the roughness profile Ra has been sufficiently reduced), the arithmetical mean height of the primary profile Pa does not decrease if undulations remain. Accordingly, during the grinding substep (step S6-1), grinding must be continued even after Ra has been reduced, so as to sufficiently remove undulations.

Subsequently, the journals 11 and pins 12 are lapped. Specifically, a film coated with fine abrasive grains are used to polish the journals 11 and pins 12. The lapping is divided into the substeps of rough lapping (step S6-2) and finish lapping (step S6-3), where the rough lapping (step S6-2) uses a film coated with alumina abrasive grains and the finish lapping (step S6-3) uses one with diamond abrasive grains.

The lapping substeps (steps S6-2 and S6-3) grind off sharp protrusions on the surfaces of the journals 11 and pins 12 to provide plateau surfaces. This reduces the reduced peak height Rpk.

During the lapping substeps (steps S6-2 and 6-3), it is preferable to perform the following processes, (1) to (4), to prevent the product from being recessed at the center as shown in JP 2004-276121: (1) a polishing film with a small width is used, which is forwarded in the axial direction for polishing; this makes it easier for lubricant to reach central regions of the film; (2) the size of the abrasive grains is minimized; this leads to smaller cut depths, which mitigates grinding, preventing excesses; (3) the rate at which the workpiece is rotated is increased, and the pressing force is reduced; this will increase the thickness of the oil (or water) film between the polishing film and workpiece; and (4) the amount of the lubricant oil (or water) is increased; this will increase the thickness of the oil (or water) film between the polishing film and workpiece.

For each of the substeps of rough lapping (step S6-2) and finish lapping (step S6-3), the speed at which the film is forwarded in the axial direction of the crankshaft is minimized. This will remove small undulations, further reducing the arithmetical mean height of the primary profile Pa.

The construction of the crankshaft 10 according to an embodiment of the present invention and one exemplary method of manufacturing the same have been described. This present embodiment provides a crankshaft with improved seizure resistance.

EXAMPLES

Now, the present invention will be described more specifically by means of examples. The present invention is not limited to these examples.

Figure 7:
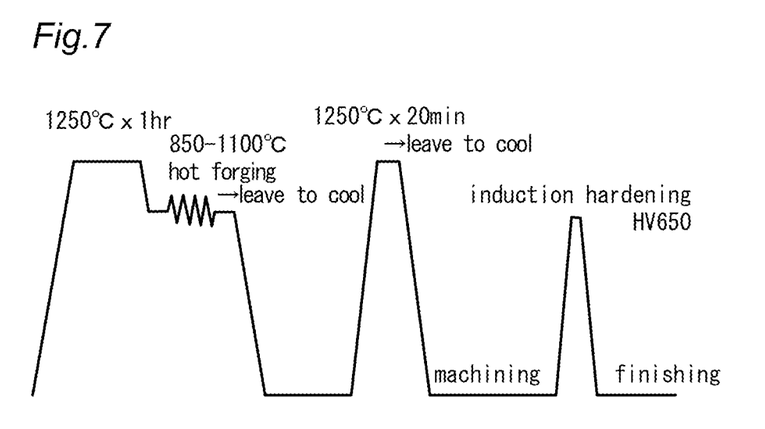
FIG. 7 is a heat pattern for test shafts fabricated for the examples.

A steel having the chemical composition shown in Table 1 was used as raw material to fabricate test shafts for seizure tests. FIG. 7 shows a heat pattern during the fabrication of the test shafts.

TABLE 1

| Chemical composition (in mass %, balance Fe and impurities) | | | | | | | |
|---|---|---|---|---|---|---|---|
| C | Si | Mn | P | S | Cr | Al | N |
| 0.38 | 0.50 | 1.50 | 0.015 | 0.060 | 0.15 | 0.002 | 0.0175 |

Specifically, the raw material was heated at 1250° C. for one hour and then hot forged at 1100° C. to 850° C.; upon completion of forging, the material was air cooled to room temperature. Thereafter, a normalizing process was performed in which the material was heated at 1250° C. for 20 minutes and then air cooled, before being machined (i.e., ground) until the outer diameter was about 48 mm. Then, induction hardening was performed to adjust the surface hardness to HV650.

Different pieces of the material were finished by one of the following three processes: (1) grinding only; (2) a combination of grinding and rough lapping; and (3) a combination of grinding, rough lapping and finish lapping, thus producing test shafts having various surface geometries. The rough lapping was performed using a film coated with alumina abrasive grains with grain diameters of 9 to 15 µm, whereas the finish lapping was performed using a film coated with diamond abrasive grains of grain diameters of 1 to 3 µm (#8000 to #4000). The outer diameter of each of the test shafts was adjusted such that the clearance between the shaft and the bearing used for seizure testing, discussed below, was about 0.090 mm.

The surface geometries of the fabricated test shafts were measured using a contact roughness tester (SJ-412 from Mitutoyo Corporation) in accordance with the method described in connection with the embodiment.

Figure 8:
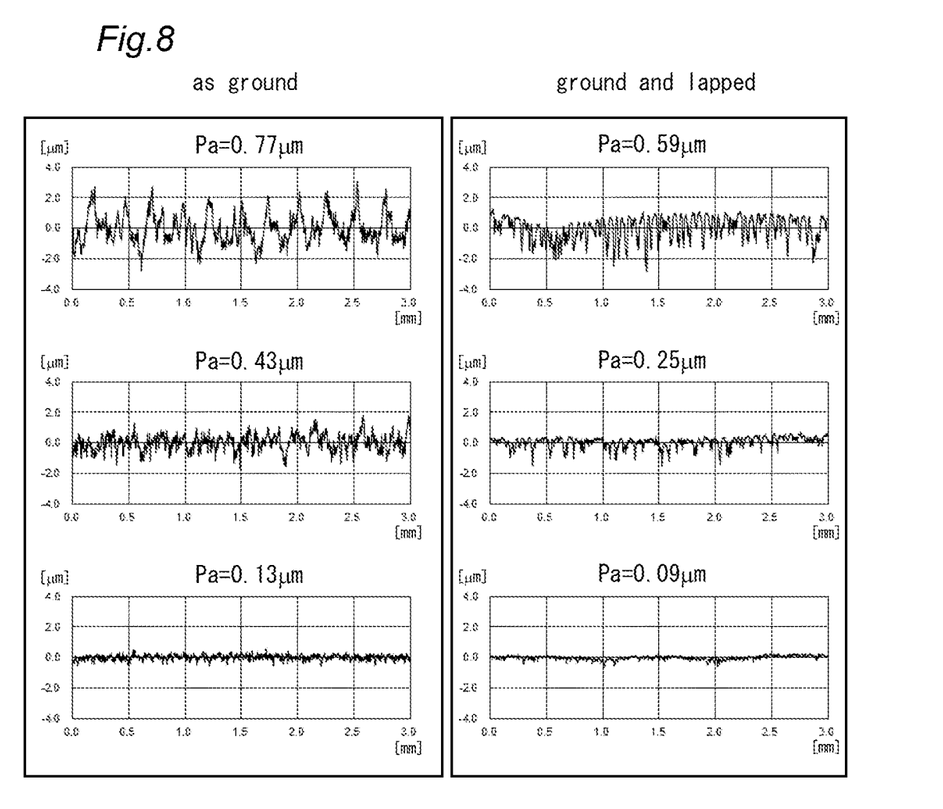
FIG. 8 shows the primary profiles of the test shafts fabricated for the examples.

FIG. 8 shows exemplary primary profiles of the fabricated test shafts. The primary profiles on the left represent test shafts on which only grinding was performed, while the primary profiles on the right represent test shafts on which lapping was performed in addition to grinding. As shown in FIG. 8, the test shafts on which only grinding had been performed had sharp reduced peaks, where the peaks were triangular in shape, whereas the test shafts on which lapping had been performed in addition to grinding had its reduced peaks ground off such that the peaks were trapezoidal in shape.

Figure 9:
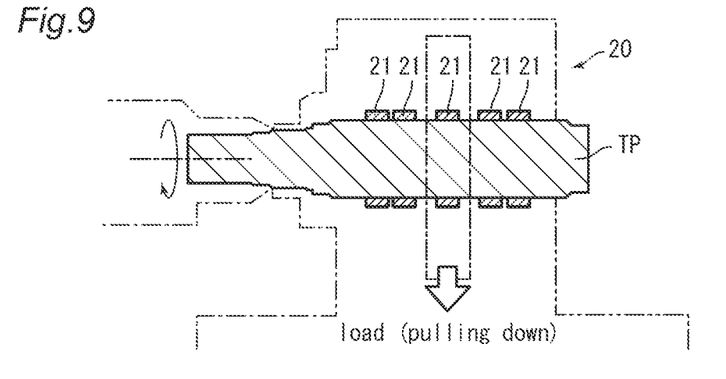
FIG. 9 is a schematic view of evaluation equipment used for the seizure tests.

Next, the fabricated test shafts were used to conduct seizure tests. The seizure tests were conducted using a crank-metal wear/seizure-resistance evaluator from Shinko Engineering Co., Ltd. FIG. 9 shows a schematic view of the evaluator, indicated by 20. A test shaft TP was inserted into a plurality of bearings 21, and the test shaft TP was rotated by a motor (not shown) at 8000 rpm while the bearings 21 were being supplied with oil. The metal of the bearings used was an Al alloy in the range of HV40 to HV50. The lubricant was 0W-20, the temperature of oil being supplied was 140° C., and the oil pressure was 0.8 MPa.

Figure 10:
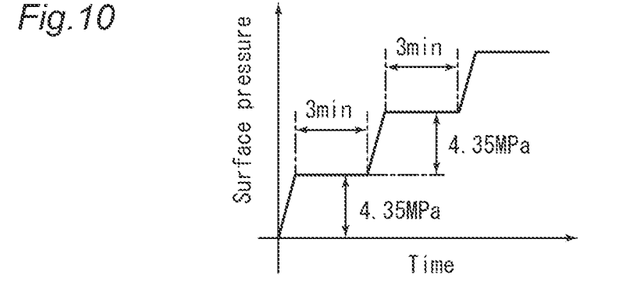
FIG. 10 is a schematic diagram showing how the surface pressure applied to the test shafts was changed over time.

With these conditions kept, the bearings 21 were moved downward, one at a time, to cause a stepwise increase in the surface pressure applied to the test shaft TP, and the evaluator was operated until seizure occurred. FIG. 10 schematically shows how the surface pressure applied to the test shaft TP was changed over time. For each step, the surface pressure was held at the same level for three minutes; from one step to the next, the surface pressure was increased by 4.35 MPa; and the time required by each increase in surface pressure was 15 seconds. It was determined that seizure occurred when the surface temperature of the test shaft TP increased to or above 280° C., or when the torque applied to the test shaft increased to or above 25 Nm.

Figure 12:
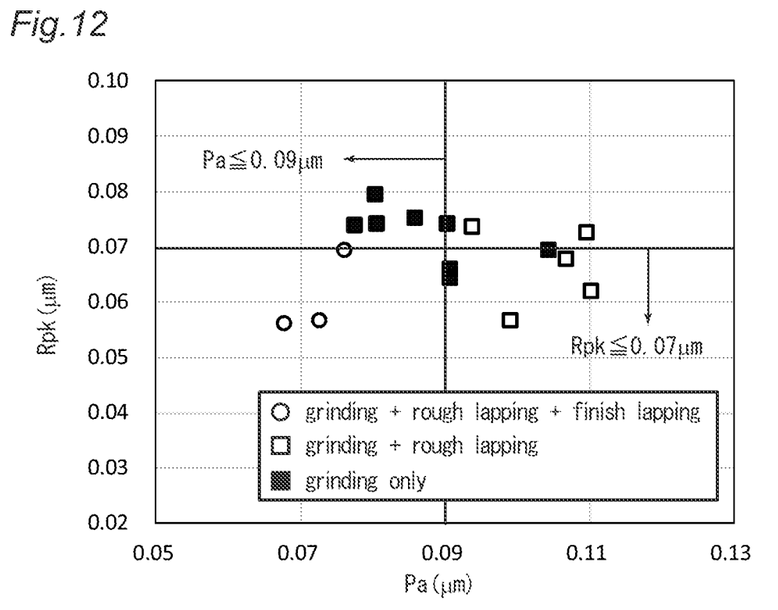
FIG. 12 shows the relationship between the conditions for finishing and the surface geometry (Pa and Rpk).

The conditions for the finishing of each test shaft, as well as its surface geometry and seizure surface pressure, are shown in Table 2.

graph also shows that if grinding, rough lapping and finish lapping were performed, surface geometries were obtained in which the arithmetical mean height of the primary profile Pa was not larger than 0.090 μm and the reduced peak height Rpk was not larger than 0.070 μm.

Figure 13:
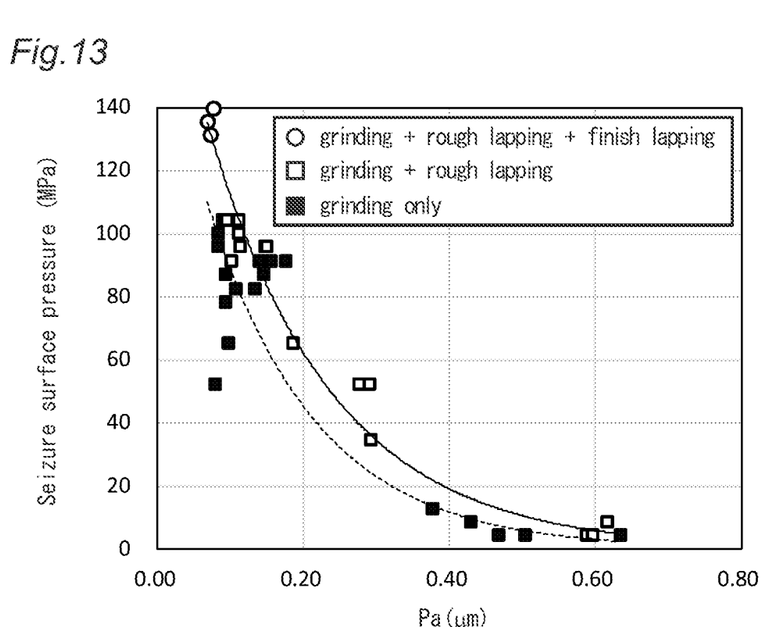
FIG. 13 shows the relationship between Pa and seizure surface pressure.

FIG. 13 shows the relationship between Pa and seizure surface pressure. FIG. 13 shows that the smaller the arithmetical mean height of the primary profile Pa, the larger the seizure surface pressure. The graph also shows that if lapping was performed in addition to grinding, the seizure surface pressure was higher than in examples with only grinding. The graph also shows that the test shafts on which grinding, rough lapping and finish lapping had been performed such that Pa was not larger than 0.090 μm and Rpk was not larger than 0.070 μm had significantly improved seizure surface pressures.

TABLE 2

| Test No. | Finishing | Ra (μm) | Pa (μm) | Rpk (μm) | Seizure surface pressure (MPa) | Other info. |
|---|---|---|---|---|---|---|
| 1 | grinding + rough lapping + finish lapping | 0.058 | 0.068 | 0.056 | 134.8 | inv. ex. |
| 2 | grinding + rough lapping + finish lapping | 0.059 | 0.073 | 0.057 | 130.5 | inv. ex. |
| 3 | grinding + rough lapping + finish lapping | 0.065 | 0.076 | 0.070 | 139.2 | inv. ex. |
| 4 | grinding only | 0.436 | 0.501 | 0.760 | 4.3 | comp. ex. |
| 5 | grinding only | 0.338 | 0.466 | 0.584 | 4.3 | comp. ex. |
| 6 | grinding only | 0.524 | 0.633 | 0.715 | 4.3 | comp. ex. |
| 7 | grinding only | 0.411 | 0.427 | 0.557 | 8.7 | comp. ex. |
| 8 | grinding only | 0.369 | 0.427 | 0.559 | 8.7 | comp. ex. |
| 8 | grinding only | 0.318 | 0.376 | 0.399 | 13.0 | comp. ex. |
| 10 | grinding only | 0.125 | 0.137 | 0.142 | 91.3 | comp. ex. |
| 11 | grinding only | 0.133 | 0.143 | 0.138 | 87.0 | comp. ex. |
| 12 | grinding only | 0.143 | 0.153 | 0.141 | 91.3 | comp. ex. |
| 13 | grinding only | 0.136 | 0.146 | 0.136 | 95.7 | comp. ex. |
| 14 | grinding only | 0.125 | 0.132 | 0.138 | 82.5 | comp. ex. |
| 15 | grinding only | 0.160 | 0.173 | 0.190 | 91.3 | comp. ex. |
| 16 | grinding only | 0.077 | 0.091 | 0.066 | 87.0 | comp. ex. |
| 17 | grinding only | 0.079 | 0.090 | 0.074 | 78.3 | comp. ex. |
| 18 | grinding only | 0.086 | 0.095 | 0.105 | 65.2 | comp. ex. |
| 19 | grinding only | 0.076 | 0.081 | 0.074 | 100.0 | comp. ex. |
| 20 | grinding only | 0.079 | 0.086 | 0.075 | 104.4 | comp. ex. |
| 21 | grinding only | 0.071 | 0.080 | 0.080 | 95.7 | comp. ex. |
| 22 | grinding only | 0.071 | 0.104 | 0.070 | 82.6 | comp. ex. |
| 23 | grinding only | 0.070 | 0.091 | 0.065 | 87.0 | comp. ex. |
| 24 | grinding only | 0.069 | 0.078 | 0.074 | 52.2 | comp. ex. |
| 25 | grinding + rough lapping | 0.515 | 0.587 | 0.266 | 4.3 | comp. ex. |
| 26 | grinding + rough lapping | 0.522 | 0.615 | 0.399 | 8.7 | comp. ex. |
| 27 | grinding + rough lapping | 0.476 | 0.595 | 0.205 | 4.3 | comp. ex. |
| 28 | grinding + rough lapping | 0.227 | 0.274 | 0.146 | 52.2 | comp. ex. |
| 29 | grinding + rough lapping | 0.240 | 0.291 | 0.132 | 34.8 | comp. ex. |
| 30 | grinding + rough lapping | 0.243 | 0.288 | 0.105 | 52.2 | comp. ex. |
| 31 | grinding + rough lapping | 0.076 | 0.099 | 0.057 | 91.3 | comp. ex. |
| 32 | grinding + rough lapping | 0.082 | 0.110 | 0.062 | 95.7 | comp. ex. |
| 33 | grinding + rough lapping | 0.081 | 0.110 | 0.073 | 100 | comp. ex. |
| 34 | grinding + rough lapping | 0.069 | 0.094 | 0.074 | 104.4 | comp. ex. |
| 35 | grinding + rough lapping | 0.067 | 0.107 | 0.068 | 104.4 | comp. ex. |
| 36 | grinding + rough lapping | 0.068 | 0.109 | 0.140 | 104.4 | comp. ex. |
| 37 | grinding + rough lapping | 0.125 | 0.145 | 0.122 | 95.7 | comp. ex. |
| 38 | grinding + rough lapping | 0.128 | 0.148 | 0.131 | 95.7 | comp. ex. |
| 39 | grinding + rough lapping | 0.165 | 0.184 | 0.144 | 65.2 | comp. ex. |

Figure 11:
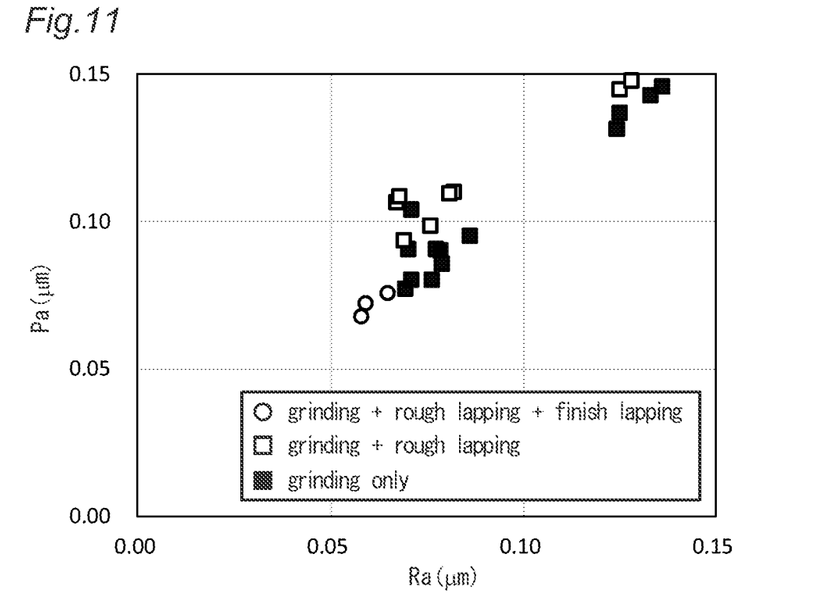
FIG. 11 shows the relationship between the average roughness Ra and the arithmetical mean height of a primary profile Pa.

FIG. 11 shows the relationship between the average roughness Ra and the arithmetical mean height of a primary profile Pa. FIG. 11 shows that the value of Pa can vary even for about the same value of Ra.

Figure 14:
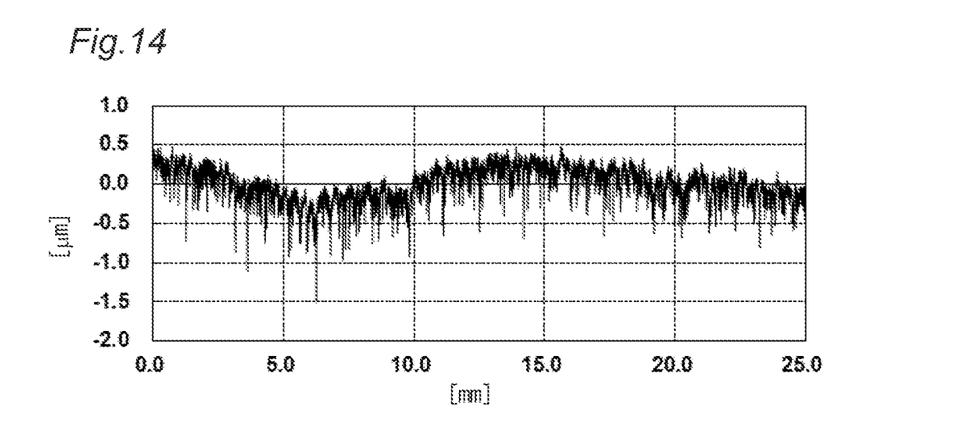
FIG. 14 is the primary profile of a test shaft for a comparative example.
Figure 15:
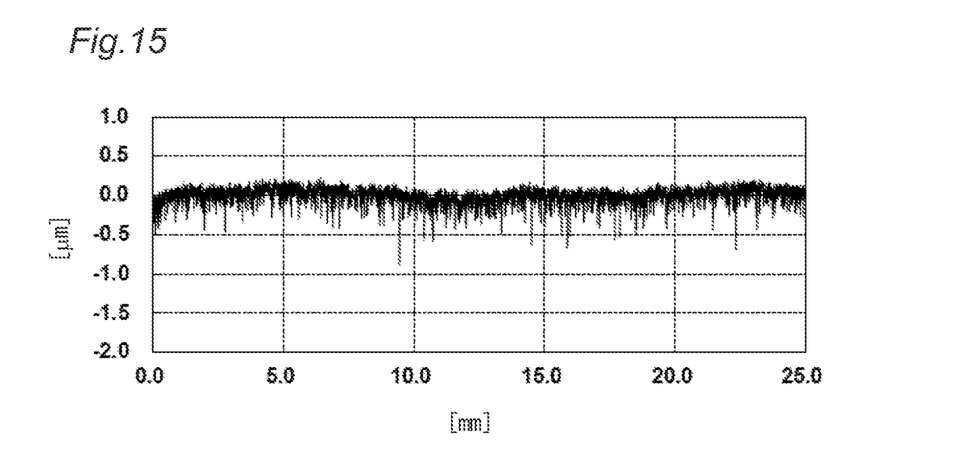
FIG. 15 is the primary profile of a test shaft for an inventive example.

FIG. 12 shows the relationship between the conditions for finishing and the surface geometry (Pa and Rpk). FIG. 12 shows that if lapping, in addition to grinding, was performed for the finishing, the reduced peak height Rpk tended to be small compared with examples with only grinding. The FIG. 14 shows the primary profile of the test shaft for a comparative example (Test No. 15). FIG. 15 shows the primary profile of the test shaft for an inventive example (Test No. 1). A comparison between FIGS. 14 and 15 shows that the test shaft of the inventive example (FIG. 15) had smaller undulations, not just smaller surface roughnesses.

These results demonstrate that if the arithmetical mean height of the primary profile Pa is 0.090 μm or smaller and the reduced peak height Rpk is 0.070 μm or smaller, seizure resistance can be significantly improved over conventional shafts.

Although an embodiment of the present invention has been described, the above-described embodiment is merely an example that can be used to carry out the present invention. Accordingly, the present invention is not limited to the above-described embodiment, and the above-described embodiment, when carried out, can be modified as appropriate without departing from the spirit of the invention.

The invention claimed is:

1. A crankshaft comprising:
   a journal; and
   a pin,
   each of the journal and pin having such a surface geometry that an arithmetical mean height of a primary profile, Pa, is 0.090 μm or smaller and a reduced peak height Rpk is 0.070 μm or smaller,
   wherein the arithmetical mean height of a primary profile Pa is defined in JIS B 0601 (2001), and the reduced peak height Rpk is defined in JIS B 0671 (2002).

2. A method of manufacturing the crankshaft according to claim 1, comprising:
   a grinding step in which the journal and the pin are ground;
   a rough lapping step in which the journal and pin that have been ground are lapped using a film coated with alumina abrasive grains; and
   a finish lapping step in which the journal and pin that have been roughly lapped are lapped using a film coated with diamond abrasive grains.

* * * * *